July 14, 1953     J. H. BOOTH     2,645,510
JOINT ASSEMBLY
Filed Nov. 30, 1950     2 Sheets-Sheet 1
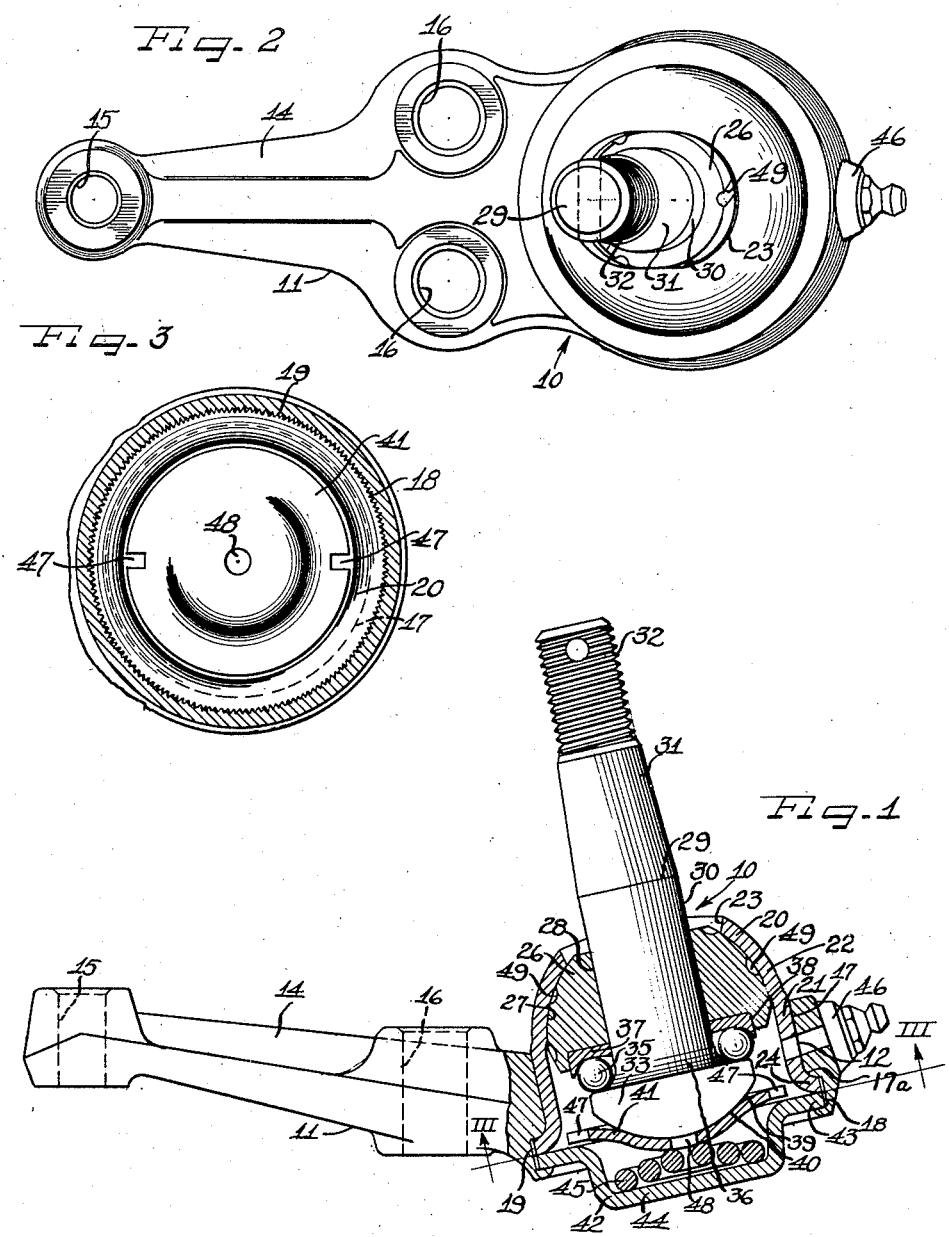
Inventor
James H. Booth July 14, 1953  J. H. BOOTH  2,645,510
JOINT ASSEMBLY
Filed Nov. 30, 1950  2 Sheets-Sheet 2
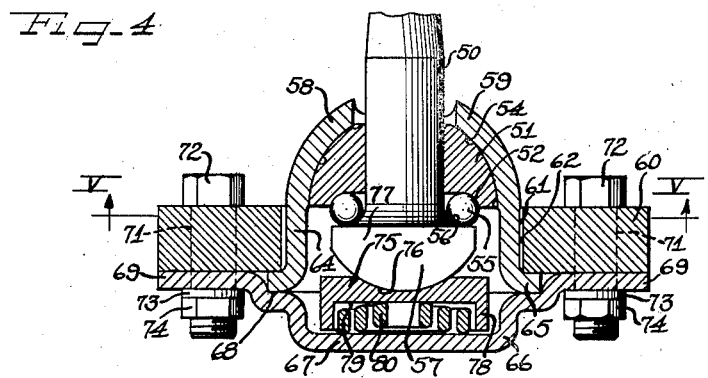
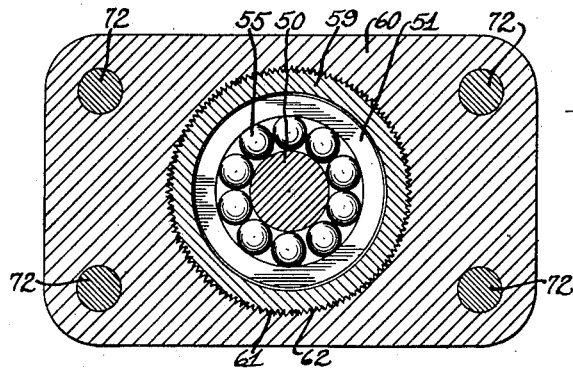
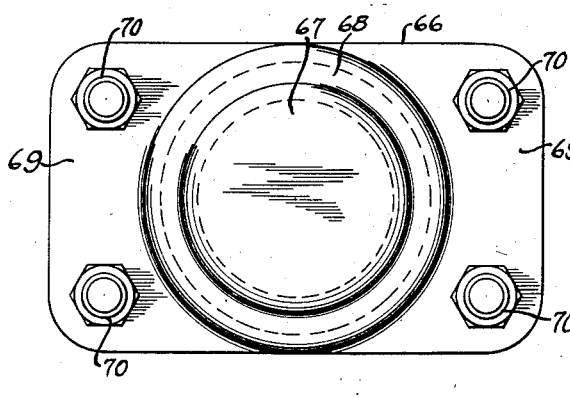
Inventor
James H. Booth Patented July 14, 1953

2,645,510

UNITED STATES PATENT OFFICE 2,645,510

JOINT ASSEMBLY

James H. Booth, Venice, Mich., assignor to Thompson Products, Inc., Cleveland, Ohio, a corporation of Ohio Application November 30, 1950, Serial No. 198,456

12 Claims. (Cl. 287—90)

1

This invention relates to a ball joint assembly embodying an improved ball socket and means for retaining the same in an attaching arm.

More specifically, the invention relates to improved ball joint assemblies which include a separate ball socket member pressed into the eye of an attaching arm and retained therein in non-rotating relationship.

The joints of the present invention are especially useful in connection with wheel supporting members in automotive independent ball-type wheel suspensions. Joints utilized in this connection must have high load capacity as to both continuous and shock loading conditions and yet must be easily and inexpensively manufactured.

It will be readily appreciated from the following description that the joints of the present invention are useful in many applications other than wheel suspension, and therefore it is not intended that the invention be limited to any particular usage.

According to this invention, an attachment arm has an eye at one end thereof for receiving a sheet metal, case-hardened ball socket. The socket member has a substantially cylindrical portion pressed into the eye and prevented from rotating therein by attachment or mating means such as serrations between the socket and the surrounding wall of the eye. An integral segmental spherical socket portion of the socket member extends out of the eye and contains a conforming segmental spherical bearing member in rotatable relationship therein. A joint stud having a cylindrical portion is rotatably disposed in the socket member and extends through the bearing member out of the socket. Thrust bearing means are provided between the stud head and the adjacent portion of the bearing member, and the spherical surfaced end of the stud head is disposed in a mating spherical indentation in a bearing washer. A retaining cap is fixedly disposed over the end of the eye opposite to the segmental spherical bearing surfaces and contains a compression spring in a bowl-like depression therein which acts between the retaining cap and the bearing washer to maintain the various bearing surfaces in proper bearing contact and to take up wear therebetween.

It is then an object of the present invention to provide a simplified ball joint embodying a separate, self-supporting ball socket insert.

Another object of this invention is to provide an improved ball joint construction especially adapted for high load capacity.

A further object of the invention is to provide

2 improved means for retaining a ball socket member in a ball joint attachment arm.

Still another object of this invention is to provide a simplified construction for a joint assembly embodying an attachment arm having an eye at one end thereof with a self-supporting sheet metal ball socket member in fixed non-rotating relationship therein.

A specific object of the present invention is to provide an improved and simplified ball joint assembly for use in an automotive independent wheel suspension in which a self-supporting sheet metal ball socket is pressed into a conforming eye in a housing arm and is prevented from rotating with respect thereto by serrations between the arm and the socket member.

Other and further objects, features and advantages of the present invention will become apparent from the following detailed description of two embodiments, which are shown by way of example only, in the accompanying sheet of drawings, in which—

On the drawings:

Figure 1 is a side sectional view of a preferred embodiment of the invention with the studs, ball bearings and the attachment portion of the housing arm shown in elevation.

Figure 2 is a top plan view of the joint assembly according to Figure 1.

Figure 3 is a sectional view taken substantially along line III—III of Figure 1.

Figure 4 is a sectional view of a second embodiment of the invention with the stud and ball bearings in elevation.

Figure 5 is a sectional view taken along line V—V of Figure 4 with the ball bearings in elevation.

Figure 6 is a bottom plan view showing the retaining cap of the embodiment of Figure 3.

As shown on the drawings:

In Figs. 1 and 2 is illustrated a ball joint assembly 10 having a housing or attachment arm 11 with a circular eye 12 through one end portion thereof and an attachment portion 14 containing means for attaching the housing arm 11 to a connecting member. Herein such means are shown as an attachment bolt hole 15 at the end of the arm 11 opposite to the eye 12 and two attachment bolt holes 16 located between the bolt hole 15 and the eye 12.

The eye 12 has a smooth cylindrical portion 17 opening at one side of the end portion of the housing arm 11 and a shorter cylindrical portion 18 of greater diameter than the portion 17 opening at the opposite side of the housing arm. A rounded annular shoulder 17a is formed between the two cylindrical portions. A plurality of attachment or mating means such as axial serrations 19 are formed around the periphery of the cylindrical portion 18.

A ball socket or cup member 20 is formed of sheet metal or the like and has a substantially cylindrical portion 21 and an integral segmental spherical or socket portion 22.

The socket portion 22 terminates with a reduced size opening 23 of oval shape with its major axis in a vertical plane containing the axis of the arm 11 as seen in Figure 1. It is important that the opening 23 be positively retained in this position because the greatest pivoting movement of a stud to be described hereinbelow takes place in this vertical plane as seen in Figure 1.

The socket member 20 is in the form of a cup and is pressed into the eye 12 with the cylindrical portion 21 in conforming relationship with the cylindrical portion 17 of the eye and with the socket portion 22 extending out of the eye. At its open mouth or free periphery the cylindrical portion 21 of the socket member has a continuous radially outwardly flared flange 24 which is in conforming relationship with the rounded annular shoulder 17a formed between the cylindrical portions 17 and 18 of the eye 12. The periphery of the flange 24 is in continuous engagement with the serrations 19 formed about the cylindrical portion 18, and hence the socket member 20 is positively prevented from rotating with respect to the housing arm 11. Thus, the oval opening 23 will always be maintained with its major axis in a plane of the axis of the arm 11.

The inside spherical diameter of the segmental spherical socket 22 is of slightly smaller diameter than the cylindrical portion 21 in order that a segmental spherical bearing member 26 having a spherical bearing surface 27 adapted to conform to the inside surface of the socket 22 may be easily inserted through the cylindrical portion 21 into conforming relationship with the socket 22.

In order to provide a hardened, long-wearing bearing surface for the socket 22 the surface of the socket is casehardened. The material of the socket member 20 inside of the casehardened surface is retained in its original tough state in order to protect the member against cracking and the like due to shock loading. The spherical bearing surface 27 of the bearing member 26 may also be casehardened or the entire bearing member may be heat-treated in order to make it wear-resistant.

The bearing member 26 has a cylindrical bore 28 therethrough. A stud 29 is inserted through the bore 28 with a cylindrical shank portion 30 in slidable contact with the walls thereof. The stud 29 has an integral tapered shank portion 31, adjacent the cylindrical shank portion 30, for conforming engagement in a mating tapered hole in a connecting member (not shown). The shank of the stud 29 adjacent the tapered portion 31 terminates in a threaded end portion 32 for receiving a retaining nut (not shown). The opposite end of the stud 29 is provided with a radially enlarged head 33.

Thrust bearing means are provided between the head 33 of the stud 29 and the adjacent end of the bearing member 26. Herein such means comprise ball bearings 35 retained in ball bearing relationship between a stud race 36, provided between the stud head 33 and the cylindrical portion 30 of the stud, and a race insert 37. The race insert 37 is of generally annular shape and is retained in an annular groove 38 formed in the bearing member 26 at the end of the bore 28. The race insert 37 may be retained in the groove 38 by any suitable means such as pressfitting therein. In order to make the thrust bearing means relatively wear-resistant the race insert 37 may be hardened and the race 36 of the stud 29 may be casehardened.

The end face of the stud head 33 is provided with a spherical surface 39 which is disposed in a conforming spherical impression 40 formed in a bearing washer 41.

A retaining cap 42 having an outer peripheral flange 43 and a central cup-shaped depression 44 is inserted into the open end of the cylindrical portion 18 of the eye 12 with the outer periphery of the flange 43 in continuous engagement with the serrations 19. The end wall of the cylindrical portion 18 is spun or peened over the outer peripheral portion of the flange 43 in order to retain the cap 42 in fixed position over the end of the eye 12. The cap 42 is spaced properly with respect to the stud 29 and the bearing member 26 by abutting the socket member flange 24. Thus, the socket member 20 is prevented from moving axially by the cap 42 on one side of the flange 24 and the shoulder 17a on the other side.

A conically shaped coil compression spring 45 is disposed within the depression 44 between the cap 42 and the bearing washer 41. Thus, all of the mating bearing surfaces are urged into proper bearing contact and automatic means is provided for taking up wear therebetween.

Means are provided for lubricating the mating bearing surfaces within the bearing assembly, and herein such means comprise a lubricant fitting 46 communicating with the interior of the bearing assembly. A pair of grease notches 47 are provided in the outer periphery of the bearing washer 41 in order to allow lubricant to easily pass into the depression 44 of the cap 42. A central lubricant aperture 48 is provided in the spherical impression 40 of the bearing washer in order to insure proper lubrication between this spherical surface and the spherical surface 39 of the stud head 33.

In order to provide proper lubrication between the mating spherical bearing surfaces of the bearing member 26 and the socket 22 a plurality of spiral lubricant channels 49 are formed in the spherical surface 27 of the bearing member 26 and provide lubricant reservoirs or passages extending in spiral fashion from the lower end to the upper end of the spherical surface 27 as seen in Fig. 1.

A second embodiment of the invention is illustrated in Fig. 4 in which a stud 50, similar to the stud 29 is rotatably disposed in a segmental spherical bearing member 51 having a ball bearing race 52 at one end thereof and spiral lubricant grooves 54 in its spherical surface. A plurality of ball bearings 55 are disposed between the ball bearing race 52 and a ball bearing race 56 formed adjacent a head 57 of the stud 50 thereby providing an antifriction thrust bearing between the stud and the bearing member.

The bearing member is disposed in a segmental spherical socket portion 58 of a bearing socket or cup member 59, somewhat similar to the socket member 20 shown in the first embodiment.

A substantially flat attachment arm or housing 60 contains a circular eye 61 therethrough, said eye having mating means such as a plurality of serrations 62 around the entire periphery thereof. The socket member 59 is pressed into the eye 61 of the arm 60 with the segmental spherical or socket portion 58 extending therebeyond and a substantially cylindrical portion 64 engaged with the serrations 62 to prevent rotation of the socket with respect to the arm. A radially outwardly directed integral flange 65 engages one side of the arm 60 about the margin of the eye 61 to prevent movement of the socket member in the direction of its socket portion 58.

A retaining cap 66 having a bowl-like depression 67 and a shallower annular groove 68 provided about the depression 67 is disposed over the open end of the socket member 59 and has a pair of opposed ears 69 contacting the surface of the arm 60. The annular flange 65 of the socket member is retainingly disposed within the annular groove 68 of the cap. A pair of bolt holes 70 is provided through each of the ears 69 and mate with bolt holes 71 through the arm 60. Bolts 72 are inserted through the the bolt holes 70 and 71 and lock washers 73 and nuts 74 are inserted over the threaded ends of the bolts 72 in order to retain the cap 66 in fixed relationship with the arm 60 and to fixedly retain the socked member 59 within the eye 61.

A bearing washer 75 is provided between the depression 67 of the cap 66 and the stud end 57 and has a central spherical cavity 76 in conforming spherical bearing relationship with a spherical end face 77 of the stud head. A downwardly directed annular flange 78 is provided about the outer periphery of the bearing washer 75 and provides a cavity 79 on the side of the washer opposite the spherical cavity 76. A conically-shaped coil compression spring 80 is disposed between the bearing washer 75 and the retaining cap 66 in the depression 67 and within the cavity 79.

Thus, all the mating bearing surfaces are urged into proper bearing contact and automatic means are provided for taking up wear therebetween.

From the above description it will be understood that this invention provides improved ball joint assemblies having sheet metal ball socket members with casehardened spherical bearing surfaces, each of said members being pressed into a cooperating eye in an attaching arm. The socket members are prevented from rotating with respect to the attaching arm by attachment or mating means such as serrations provided therebetween. Ball-and-socket and thrust bearing means are provided and are retained within the joint assemblies by means of retaining caps which may be held in fixed relationship by peening over outer peripheral flanges or by bolting the caps to the attachment arms. Automatic bearing positioning and wear take-up means are provided.

It will be readily understood that the mating means or serrations described above may be incorporated either in the housing arm as described on the adjacent surface of the socket member or on both surfaces.

It will be understood that modifications and variations may be effected without departing from the scope of the novel concepts of the present invention.

I claim as my invention:

1. A joint assembly comprising an arm having an eye, a socket member having a substantially cylindrical portion disposed in said eye, mating means between said socket member and the wall of said eye for preventing rotation of said socket member relative to said arm, said socket member having a segmental spherical portion at one end thereof terminating in a reduced size opening, said spherical portion extending out of said eye, a stud having a head portion disposed in said socket member and a shank portion extending out of said reduced size opening, bearing means in said socket member about said stud for permitting tilting of the stud, said stud being rotatably disposed in said bearing means, means limiting movement of said socket member relative to said arm in the direction of said protruding spherical portion thereof, a closure secured to said arm spanning the end of said eye opposite to the protruding spherical portion of said socket member and thrusting against the socket member to hold said member in the eye, and a resiliently urged bearing between the head of said stud and said closure maintaining all of the mating bearing surfaces in the joint assembly in proper bearing contact.

2. A joint assembly comprising an attachment arm having an eye at one end portion thereof, a socket member having a substantially cylindrical portion retainingly disposed in said eye, serrated means between the cylindrical portion and the wall of said eye for preventing rotation of said socket member relative to said arm, said socket member having an integral self-supporting ball socket portion extending out of said eye and having a reduced size aperture at the end thereof, a segmental spherical bearing member tiltably disposed in said socket portion and having a cylindrical bore therethrough, a stud having a cylindrical portion rotatably disposed in the cylindrical bore through said bearing member and having a head disposed inside said socket member, thrust bearing means disposed between the head of said stud and the adjacent portion of said bearing member, a retaining cap fixedly disposed over the open end of said eye, a bearing washer disposed between the head of said stud and said retaining cap, and spring means disposed between said bearing washer and said retaining cap urging said washer into bearing contact with said stud head to retain all of the mating bearing surfaces in proper bearing contact.

3. In a ball joint assembly, an arm having an eye through one portion thereof, a socket member fixedly disposed in said eye and having an integral socket portion extending out of said eye, a stud in said socket member and having a shank projecting through said integral socket portion, said stud being tiltable and rotatable relative to said socket member, attachment means between said socket member and the wall of said eye for preventing rotation of the socket member relative to the arm, and means for retaining the stud in proper bearing contact within said socket member.

4. A joint assembly comprising an attaching arm having an eye through one end portion thereof, said eye having attachment means around the periphery thereof, a sheet metal socket member having a portion fixedly disposed in said eye and engaging said attachment means to prevent rotation of the socket member with respect to the attaching arm, said socket member having an integral self-supporting ball socket portion extending out of said eye, a stud having a headed end portion disposed in said socket member, and means for retaining said stud in rotatable and tiltable relationship with respect to said attaching arm.

5. A joint assembly comprising an attachment arm having an eye at one end portion thereof, said eye having two coaxial substantially cylindrical portions of different diameters forming an annular shoulder therebetween, the cylindrical portion of larger diameter having a plurality of serrations about its periphery, a sheet metal socket member having a substantially cylindrical portion in fixed conforming contact with the cylindrical portion of smaller diameter of said eye, said cylindrical socket member portion terminating with an outwardly flared annular flange engaging the shoulder between the two cylindrical portions of the eye and also engaging the serrations of the eye cylindrical portion of larger diameter, said socket member having an integral self-supporting ball socket portion at its other end extending out of said eye, a stud having an end portion disposed within said socket member, and bearing means within said socket member cooperating with said end portion of the stud whereby said stud is rotatably and universally tiltably retained relative to said attachment arm.

6. A ball joint assembly comprising an attaching arm having an eye therethrough at one end portion thereof, said eye having an annular retaining shoulder therein formed between adjacent coaxial cylindrical portions of different diameters, the cylindrical portion of larger diameter having a plurality of serrations around the periphery thereof, a socket member having a portion disposed in fixed conforming relationship to the smooth surfaced cylindrical portion of said eye and to the shoulder therein, said socket member having an annular peripheral edge engaging the serrations in the serrated cylindrical portion of the eye to prevent rotation of the socket member relative to the attaching arm, said socket member having an integral self-supporting ball socket portion extending out of said eye and terminating with a reduced size opening, a segmental spherical bearing member disposed in conforming bearing relationship in said socket portion, a stud having a portion rotatably disposed in said bearing member and having a shank portion extending therethrough and out of the reduced size opening through said socket member, and means for retaining said stud and said bearing member within said socket member in proper bearing relation, said means including a coil spring for automatically taking up wear between mating bearing surfaces.

7. In a ball joint assembly having a stud rotatably and universally tiltably mounted within a socket member which is fixedly attached in an eye through one end portion of a connecting arm, improved means for retaining said socket in fixed relationship relative to said arm comprising two coaxial cylindrical portions of different diameter in said eye forming an annular retaining shoulder therebetween, the cylindrical portion of larger diameter having a plurality of serrations around the periphery thereof, a sheet metal socket member having a substantially cylindrical portion with an outwardly flared peripheral margin disposed in fixed conforming relationship to the smooth surfaced cylindrical portion of said eye and the shoulder at one end thereof, the edge of said outwardly flared margin being in continuous peripheral engagement with the serrations in said serrated cylindrical eye portion, a retaining cap inserted in said serrated cylindrical portion and having its outer peripheral edge in continuous engagement with the serrations in said cylindrical portion, the end walls of said serrated cylindrical portion being forced radially inwardly to retain said retaining cap and said socket member in fixed relationship within said eye.

8. A joint assembly comprising an attaching arm having an eye therethrough at one end portion thereof, said eye having a plurality of serrations about the periphery thereof, a socket member inserted into said eye and having an integral self-supporting ball socket portion extending out of said eye, said socket member having a radially outwardly extending peripheral flange at its other end engaging said serrations and abutting the margin of said attaching arm about said eye, a retaining cap disposed over the flanged end of said socket member and having a pair of integral ears attached to said attaching arm, said retaining cap clamping the annular peripheral flange of said socket member between the cap and the attaching arm to prevent movement of the socket member out of said eye, bearing means in said socket member, and a stud having an end portion rotatably retained in said bearing means, said stud being rotatable and universally tiltable with respect to said attaching arm.

9. A joint assembly comprising an attaching arm formed of bar stock and having an eye through one end portion thereof, a socket member having a substantially cylindrical portion fixedly disposed in said eye and an integral self-supporting ball socket portion extending out of said eye, serrated means between said socket member and the wall of said eye for preventing rotation of the socket member with respect to the attaching arm, a radially outwardly extending annular peripheral flange about the free end portion of said socket member cylindrical portion, said flange abutting the peripheral margin of the attaching arm about said eye, a retaining cap fixedly attached to said attaching arm over the flanged end of said socket member and clamping said flange between said retaining cap and said attachment arm, a stud having an end portion retaining disposed in said socket member, and bearing means disposed about the end portion of said stud for permitting rotation and universal tilting of said stud with respect to said attaching arm.

10. In a ball joint assembly having a stud rotatably and universally tiltably disposed in a socket member on segmental ball and thrust bearing means and having an attaching arm with an eye through one end portion thereof containing the socket member, improved means for retaining the socket member in the eye in fixed non-rotating relationship comprising a plurality of serrations formed about the periphery of said eye and engaging a portion of the socket member, a radially outwardly extending annular flange about one end portion of said socket member, said flange abutting the margin of the attaching arm about said eye, and a retaining cap fixedly attached to said attaching arm over the flanged end of said socket member, said retaining cap having an annular groove therein containing said socket member annular flange in substantially conforming relationship therein to clamp the flange between the retaining cap and the attaching arm.

11. A joint assembly comprising an attaching arm having an eye therethrough at one end portion thereof, a sheet metal socket member having a portion disposed in conforming engagement within said eye, said socket member having an integral self-supporting ball socket portion extending out of said eye and having a casehardened ball socket bearing surface therein, serrated means between the socket member and the wall of said eye for preventing rotation of the socket member with respect to the attaching arm, an annular flange about the other end of said socket member and engaging said attaching arm for preventing movement of said socket member out of said eye in one direction, a retaining cap fixedly attached to said attaching arm over the flanged end of said socket member, and preventing movement of the socket member out of the eye in the other direction, a segmental ball member in conforming bearing contact with the casehardened socket portion of said socket member, and a stud having an end portion rotatably retained in said segmental ball member, said stud being universally tiltable with respect to said attaching arm by tilting of the ball member within the socket portion of the socket member.

12. A ball and socket joint comprising an eye member, a socket defining cup in the eye of said member having an outturned flange around the the mouth thereof bottomed on the member and having an opening through the closed end of the cup, a stud having a head tiltable and rotatable in the cup and a shank extending from the head through said opening, and a closure secured to the member spanning the cup mouth and clamping the cup flange against the member to retain the cup in the eye.

JAMES H. BOOTH.

References Cited in the file of this patent

UNITED STATES PATENTS

| Number | Name | Date |
|---|---|---|
| 1,775,055 | Tarbox et al. | Sept. 2, 1930 |
| 1,842,747 | Crawford et al. | Jan. 26, 1932 |
| 2,456,546 | Venditty | Dec. 14, 1948 |
| 2,533,928 | Graham | Dec. 12, 1950 |
| 2,544,583 | Booth | Mar. 6, 1951 |